United States Patent
Kulinna et al.

(10) Patent No.: US 7,768,209 B2
(45) Date of Patent: Aug. 3, 2010

(54) METHOD AND DEVICE FOR CONTROLLING A MOTOR-VEHICLE LIGHTING SYSTEM

(75) Inventors: Hans-Juergen Kulinna, Wesendorf (DE); Gabriel Schwab, Gifhorn (DE); Frank Wolf, Bruehl (DE); Patrick Schmitt, Lichtenau (DE)

(73) Assignees: Volkswagen AG, Wolfsburg (DE); Robert Bosch GmbH, Stuttgart (DE)

( * ) Notice: Subject to any disclaimer, the term of this patent is extended or adjusted under 35 U.S.C. 154(b) by 94 days.

(21) Appl. No.: 11/665,398

(22) PCT Filed: Sep. 24, 2005

(86) PCT No.: PCT/EP2005/010355

§ 371 (c)(1),
(2), (4) Date: Jan. 2, 2008

(87) PCT Pub. No.: WO2006/039998

PCT Pub. Date: Apr. 20, 2006

(65) Prior Publication Data

US 2008/0218084 A1    Sep. 11, 2008

(30) Foreign Application Priority Data

Oct. 12, 2004   (DE) ...................... 10 2004 049 558

(51) Int. Cl.
*B60Q 1/26* (2006.01)
(52) U.S. Cl. .......................................... 315/80; 315/77
(58) Field of Classification Search .................. 315/77, 315/78, 80, 82
See application file for complete search history.

(56) References Cited

U.S. PATENT DOCUMENTS

| 4,793,690 A | | 12/1988 | Gahan et al. |
| 4,809,177 A | | 2/1989 | Windle et al. |
| 5,136,209 A | | 8/1992 | Benedict et al. |
| 5,519,257 A | * | 5/1996 | Lock et al. ................. 307/10.8 |
| 5,666,028 A | | 9/1997 | Bechtel et al. |
| 5,886,471 A | * | 3/1999 | Benedict et al. ............... 315/82 |

(Continued)

FOREIGN PATENT DOCUMENTS

DE       38 03 138       8/1989

(Continued)

OTHER PUBLICATIONS

International Search Report, PCT International Patent Application No. PCT/EP2005/010355, dated Dec. 1, 2005.

(Continued)

*Primary Examiner*—Douglas W Owens
*Assistant Examiner*—Minh D A
(74) *Attorney, Agent, or Firm*—Kenyon & Kenyon LLP

(57) ABSTRACT

The automated switching of a vehicle lighting system is to be made more reliable. To this end, it is provided that the entire data flow from the sensors to a lighting device, which receives the control signals from a transmission module, is implemented in dual-track fashion throughout. This provides the corresponding redundancy and increases the required reliability. It is provided, in particular, to transmit to the lighting device a control signal and a correspondingly negated signal, so that the lighting device is able to check whether the data processing and data transmission are free of faults.

14 Claims, 1 Drawing Sheet

U.S. PATENT DOCUMENTS

| | | | |
|---|---|---|---|
| 5,912,534 A * | 6/1999 | Benedict | 315/82 |
| 5,990,647 A | 11/1999 | Zettler | |
| 6,015,193 A | 1/2000 | Vogel et al. | |
| 6,173,229 B1 | 1/2001 | Fennel et al. | |
| 6,191,531 B1 | 2/2001 | Reime | |
| 6,208,981 B1 * | 3/2001 | Graf et al. | 706/2 |
| 6,421,593 B1 | 7/2002 | Kempen et al. | |
| 6,538,728 B1 * | 3/2003 | Stolle et al. | 356/437 |
| 6,704,628 B1 * | 3/2004 | Fennel et al. | 701/29 |
| 7,054,722 B2 * | 5/2006 | Dalakuras et al. | 701/1 |
| 2003/0120401 A1 | 6/2003 | Bauer et al. | |
| 2004/0158376 A1 * | 8/2004 | Knueppel et al. | 701/45 |
| 2004/0195460 A1 | 10/2004 | Sailer | |

FOREIGN PATENT DOCUMENTS

| | | |
|---|---|---|
| DE | 196 30 216 | 1/1998 |
| DE | 199 37 119 | 3/2001 |
| DE | 100 05 127 | 8/2001 |
| DE | 101 62 689 | 7/2002 |
| DE | 101 64 083 | 7/2003 |
| EP | 0 642 951 | 3/1995 |
| EP | 0 997 359 | 5/2000 |
| EP | 1 027 227 | 8/2000 |
| EP | 1 205 373 | 5/2002 |
| EP | 1 443 399 | 8/2004 |
| WO | WO 02/099547 | 12/2002 |

OTHER PUBLICATIONS

Written Opinion of the International Searching Authority, PCT International Patent Application No. PCT/EP2005/010355, dated Dec. 1, 2005 (English-language translation provided).

* cited by examiner

METHOD AND DEVICE FOR CONTROLLING A MOTOR-VEHICLE LIGHTING SYSTEM

FIELD OF THE INVENTION

The present invention relates to a control device for a lighting device of a vehicle. The control device may include: at least two sensor devices for recording control information while outputting a first sensor signal and a second sensor signal; an evaluation device for generating a first control signal for the lighting device on the basis of the first and second sensor signals; and a transmission device for transmitting the first control signal to the lighting device. Furthermore, the present invention relates to a corresponding method for controlling the lighting device.

BACKGROUND INFORMATION

Certain sensors, in particular light sensors, which are used for the automatic control of the driving lights and other light sources in motor vehicles, are conventional. This automatic control is meant to assist the driver who forgets to turn on the driving lights when starting off in the dark, for instance, in towns with street lighting. This is to ensure an automatic activation of the light when dusk falls, when entering a tunnel or other dark stretches. In particular, when corresponding signals or criteria from a single or a plurality of sensor elements are present is reliable activation and deactivation of the driving light to be ensured. Such criteria are, for example, information about the ambient light from a light sensor, information about the ambient dampness from a rain sensor, or information from an interval time signal of a front wiper.

From the viewpoint of safety, it is especially important that a driving light not be turned off accidentally after having been turned on correctly, i.e., that it is turned off in a driving situation where the light should not have been turned off. This risk exists, for instance, if the data processing and data transmission are unsatisfactory. Furthermore, it is important that the driving light not be turned on inadvertently, for instance, in bright daylight or in shady stretches of only brief duration. All of this is to be implementable even without providing a switch-on delay, which is disadvantageous when entering long tunnels. Especially when entering such tunnels must the light be turned on as quickly as possible since the driver's pupils have not yet widened because of the sudden onset of darkness and the driver therefore has poor vision.

The use of a rain sensor for motor vehicles as sensor for measuring the ambient brightness is described in this context in German Published Patent Application No. 100 05 127. The signal resulting from this measurement is suitable for controlling a lighting system of a motor vehicle, for example.

Furthermore, German Published Patent Application No. 196 30 216 mentions a vehicle having a light control that is a function of the driving situation. A control unit activates a driving light whenever the brightness detected by an ambient light sensor drops below an associated first brightness threshold value and the brightness recorded by a driving-direction-specific light sensor is below an assigned second brightness threshold value.

Furthermore, European Published Patent Application No. 0 997 359 describes an integrated self-test for rain sensors. In this case, a test signal is generated, which is compared to a measuring signal.

European Published Patent Application No. 1 027 227 describes a device for controlling a lighting device. Utilized for the control are an optical sensor on the one hand, and a water sensor on the other.

SUMMARY

Example embodiments of the present invention may provide a cost-effective, simple and reliable light circuit, which ensures reliable functioning in which, in particular, a faulty switchoff of the driving light is to be avoided.

According to example embodiments of the present invention, a control device for a lighting device of a vehicle has: at least two sensor devices for recording control information while outputting a first sensor signal and a second sensor signal; an evaluation device for generating a first control signal for the lighting device on the basis of the first and second sensor signals; and a transmission device for transmitting the first control signal to the lighting device, it also being possible to generate a second control signal for the lighting device on the basis of the first and second sensor signals with the aid of the evaluation device, and, using the transmission device, the second control signal is able to be transmitted to the lighting device as control signal that is redundant with respect to the first control signal.

Furthermore, a method for controlling a lighting device of a vehicle includes: recording control information while outputting a first sensor signal and a second sensor signal; generating a first control signal for the lighting device on the basis of the first and second sensor signals; transmitting the first control signal to the lighting device; generating a second control signal for the lighting device on the basis of the first and second sensor signals; and by transmitting the second control signal to the lighting device as a control signal that is redundant with respect to the first control signal.

It may therefore be provided that a continuous dual-track data flow takes place from the sensor side to the lighting side. The redundancy created in the process provides the required reliability.

The control device may include a testing device for a plausibility check of the first and second sensor signals, a plausibility signal being generated in the process. This prevents that implausible sensor signals cause an operation of the lighting device and, in particular, the driving light. The evaluation device may have a linking device for this purpose by which the plausibility signal is able to be taken into account in the generation of the first and second control signals.

The two control signals may be binary signals. Their use allows an easy activation or deactivation. The second control signal may be negated relative to the first control signal. The lighting device will then be able to determine whether the control signals are fault-free, by checking whether it has received a negated and non-negated signal.

Furthermore, the evaluation device may include a functional module with whose aid a raw signal is able to be generated from the at least two sensor signals, which is storable in a first memory location of the functional module for generating the first control signal, and in a second memory location of the functional module for generating the second control signal. Due to the storing of the same binary signal in two different memory locations, it is possible to avoid that one bit "tips" and this cannot be detected in the further processing or control.

Example embodiments of the present invention are described in greater detail below with reference to the Figure, which constitutes a schematic basic circuit diagram of a control device and method according to example embodiments of the present invention.

DETAILED DESCRIPTION

Figure 1:
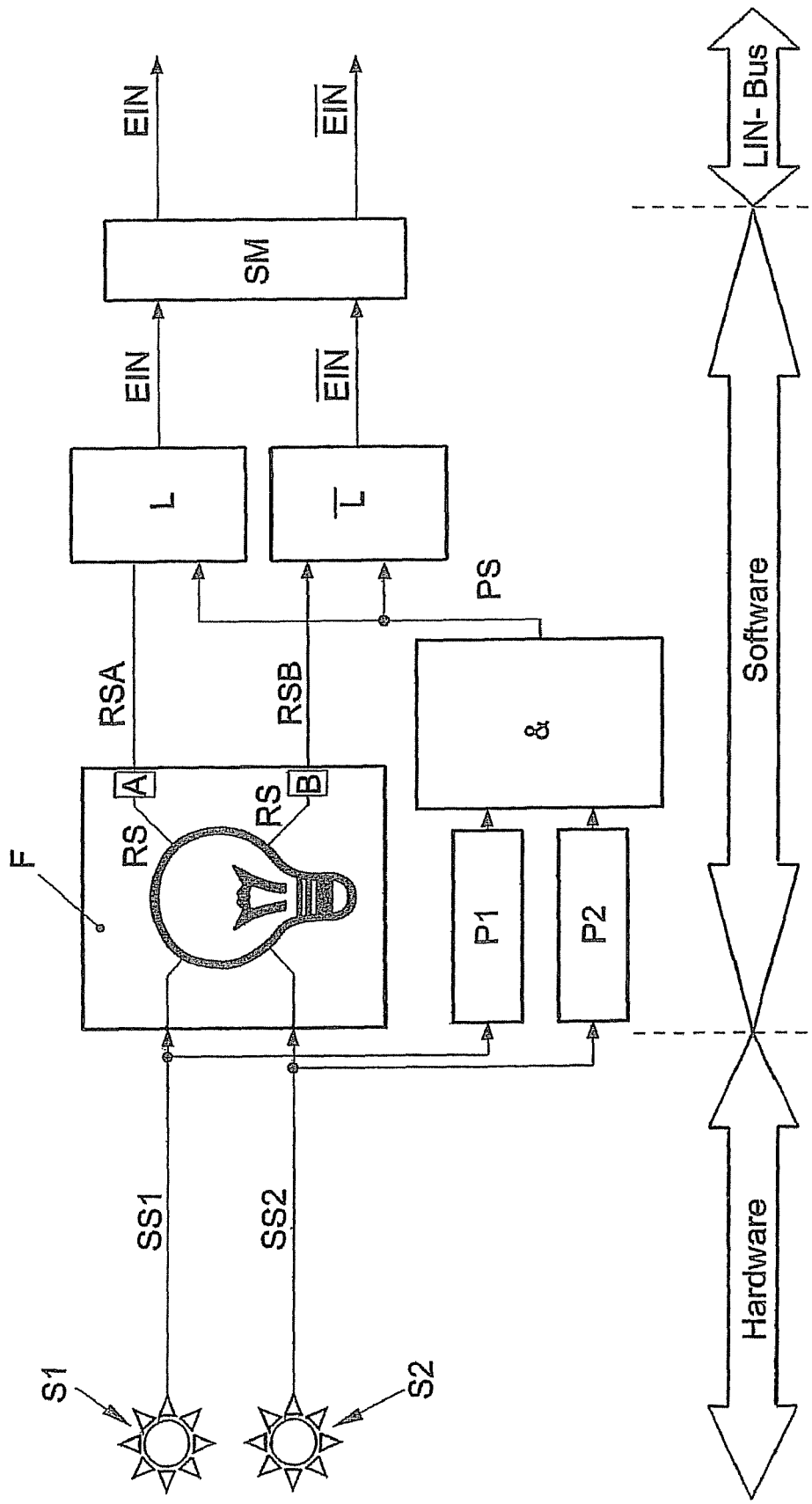
FIG. 1 is a schematic circuit diagram illustrating a control device and method according to example embodiments of the present invention.

The exemplary embodiments described in greater detail in the following text represent non-limiting, example embodiments of the present invention.

According to the Figure, the path from the sensor device to the lighting device is made up of three sections: hardware, software and LIN bus. The data flow may also be implemented across any other sections, in particular, also via a different bus. Redundancy may be provided during the entire data transmission, or at least during the largest part of the data transmission. This means that the data flow between sensor device and lighting device is conducted in two-track fashion throughout.

As illustrated in FIG. 1, two light sensors S1 and S2 are used to control the driving light of a vehicle. However, instead of a light sensor, a rain sensor or some other sensor, for instance, may be used as well. The two sensors S1 and S2 emit the two sensor signals SS1 and SS2 and route them to a corresponding evaluator. On the one hand, the two sensor signals SS1 and SS2 are utilized in a functional module F. This module realizes a specified function and constitutes a logic circuit in the example at hand, which uses the two sensor signals SS1 and SS2 to generate a raw signal RS for switching the lighting on and off. This raw signal RS is stored in a first RAM memory location A and in a second RAM memory location B. Functional module F thereby provides raw signals RSA and RSB for further processing. Both raw signals are usually the same. Only if faulty "tipping" of the bit has occurred in a memory location will the two signals or bits RSA and RSB differ.

Parallel to the processing in functional module F, each of the two sensor signals SS1 and SS2 is subjected to a plausibility check P1 and P2. In the plausibility check, it is checked whether sensor signals SS1 and SS2 are plausible signals. They are plausible if they lie within a particular specified range. The results of both plausibility checks P1 and P2 are linked to an &-gate. This results in a plausibility signal PS.

Output signals RSA and RSB of functional module F are subjected to separate processing. Signal RSA together with plausibility signal PS is linked to form a signal EIN in logic module L. In a similar manner, raw signal RSB is linked to the plausibility signal in a logic module $\overline{L}$ so as to form a control signal $\overline{EIN}$ for the lighting device. This means that the two logic modules L and $\overline{L}$ are basically identical, but one of them has a negated output.

The two control signals EIN and $\overline{EIN}$ are forwarded to a transmission module, which constitutes a transceiver for the bus. Transmission module SM transmits the two signals to the lighting device via a LIN bus, for example.

The lighting device therefore receives control signal EIN and negated control signal $\overline{EIN}$. If the lighting device detects that the two signals are not negated relative to one another, it is able to determine from this that the data processing or the data transmission is faulty. Such a fault case must lead to switching on of the light.

In the event that a digital analysis takes place and signals RSA, RSB and PS assume the binary values "0" and "1", logic module L may operate according to the following truth table:

| RSA | 1100 |
|-----|------|
| PS  | 1001 |
| EIN | 1110 |

Accordingly, the truth table for logic module $\overline{L}$ reads:

| RSB | 1100 |
|-----|------|
| PS  | 1001 |
| $\overline{EIN}$ | 0001 |

In both tables "1" means that the light is to be switched on or that the two sensor signals SS1 and SS2 are plausible. According to the first table, the light is turned on, i.e., EIN=1, if the raw signal according to the functional module results in a switch-on signal, i.e., RSA=1, and the two sensor signals SS1 and SS2 are plausible, i.e., PS=1. If the two sensor signals are not plausible, i.e., PS=0, the light is also switched on, i.e., EIN=1. Only if raw signal RSA=0 and the two sensor signals are plausible, i.e., PS=1, will the light be switched off, i.e., EIN=0.

Logic module $\overline{L}$ substantially has the same logic, except in that the result is negated. Accordingly, it obtains from the same input values the correspondingly negated control values 0001.

According to example embodiments of the present invention, the reliability of the switching of a lighting system is able to be increased by this circuit or this method since the required redundancy is provided at all times. Example embodiments of the present invention also allow the use of any other logic circuit, as long as the parallelism of the data processing and data transmission is provided.

LIST OF REFERENCE CHARACTERS

| A, B | RAM memory locations |
|------|----------------------|
| F | functional module |
| L, $\overline{L}$ | logic modules |
| EIN, $\overline{EIN}$ | control signals |
| P1, P2 | plausibility checks |
| PS | plausibility signal |
| RS, RSA, RSB | raw signals |
| SM | transmission module |
| S1, S2 | light sensors |
| SS1, SS2 | sensor signals |

What is claimed is:

1. A control device for a lighting device of a vehicle, comprising:
   at least two sensor devices configured to record control information during output of a first sensor signal and a second sensor signal;
   an evaluation device configured to generate a first control signal for the lighting device on the basis of the first sensor signal and the second sensor signal and a second control signal for the lighting device on the basis of the first sensor signal and the second sensor signal; and
   a transmission device configured to transmit the first control signal to the lighting device and to transmit the second control signal to the lighting device as a control signal that is redundant with respect to the first control signal.

2. The control device according to claim 1, further comprising a test device configured to conduct a plausibility check of the first sensor signal and the second sensor signal and to generate a plausibility signal.

3. The control device according to claim 2, wherein the evaluation device includes a link device configured to take into account the plausibility signal for generation of the first control signal and the second control signal.

4. The control device according to claim 1, wherein the control signals include binary signals.

5. The control device according to claim 4, wherein the second control signal is negated relative to the first control signal.

6. The control device according to claim 1, wherein the evaluation device includes a functional module configured to generate a raw signal from the first sensor signal and the second sensor signal, the functional module including a first memory location configured to store the raw signal for generation of the first control signal and a second memory location configured to store the raw signal for generation of the second control signal.

7. The control device according to claim 1, wherein a data flow between the sensor device and the lighting device is provided in dual-track fashion throughout and the dual-track is provided throughout a data processing and a data transmission.

8. A method for controlling a lighting device of a vehicle, comprising:
   recording control information while outputting a first sensor signal and a second sensor signal;
   generating a first control signal for the lighting device on the basis of the first sensor signal and the second sensor signal;
   generating a second control signal for the lighting device on the basis of the first sensor signal and the second sensor signal;
   transmitting the first control signal to the lighting device; and
   transmitting the second control signal to the lighting device as a control signal redundant with respect to the first control signal.

9. The method according to claim 8, further comprising performing a plausibility check of the first sensor signal and the second sensor signal while generating a plausibility signal.

10. The method according to claim 9, wherein the generating of the first control signal and the generating of the second control signal include taking into account the plausibility signal.

11. The method according to claim 8, wherein the control signals include binary signals.

12. The method according to claim 11, wherein the second control signal is negated relative to the first control signal.

13. The method according to claim 8, further comprising:
   generating a raw signal from the first sensor signal and the second sensor signal according to a specified function;
   storing the raw signal in a first memory location for generating the first control signal; and
   storing the raw signal in a second memory location for generating the second control signal.

14. The method according to claim 8, wherein a data flow between a sensor device and the lighting device is provided in dual-track fashion throughout and the dual-track is provided throughout a data processing and a data transmission.

* * * * *